United States Patent
Brancheriau

(10) Patent No.: US 6,863,465 B2
(45) Date of Patent: Mar. 8, 2005

(54) FIXING ASSEMBLY WITH HELICAL RAMP

(75) Inventor: Christian Brancheriau, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 69 days.

(21) Appl. No.: 10/268,926

(22) Filed: Oct. 11, 2002

(65) Prior Publication Data

US 2003/0103834 A1 Jun. 5, 2003

(30) Foreign Application Priority Data

Oct. 12, 2001 (FR) .......................................... 01 13182

(51) Int. Cl.$^7$ ................................................. F16B 2/02
(52) U.S. Cl. ........................... 403/348; 403/13; 403/14; 403/291; 403/350; 403/375; 411/512
(58) Field of Search ................................ 403/11, 13, 14, 403/291, 348–352, 365, 367, 372–374.1, 375; 441/366.1, 512; 296/70; 81/176.1, 176.15, 176.2, 461

(56) References Cited

U.S. PATENT DOCUMENTS

| | | | | |
|---|---|---|---|---|
| 4,067,090 A | * | 1/1978 | Schenk | 411/554 |
| 4,227,287 A | * | 10/1980 | Gunther | 411/552 |
| 5,178,504 A | | 1/1993 | Falchi | |
| 5,511,919 A | | 4/1996 | Scalise | |

FOREIGN PATENT DOCUMENTS

DE 35 38 892 A1 5/1986

* cited by examiner

Primary Examiner—Daniel P. Stodola
Assistant Examiner—Michael P. Ferguson
(74) Attorney, Agent, or Firm—Rothwell, Figg, Ernst & Manbeck

(57) ABSTRACT

An assembly comprising two parts to be assembled, a substantially cylindrical peg, a ring, a support comprising pins, means for guiding in rotation the ring relative to the support, and resilient means linked on the one hand to the ring and on the other hand to the support. The assembly further comprises a helical ramp provided on the peripheral surface of the peg and intended to receive the pin, said helical ramp comprising a first portion and a second portion in opposed helical directions.

10 Claims, 3 Drawing Sheets

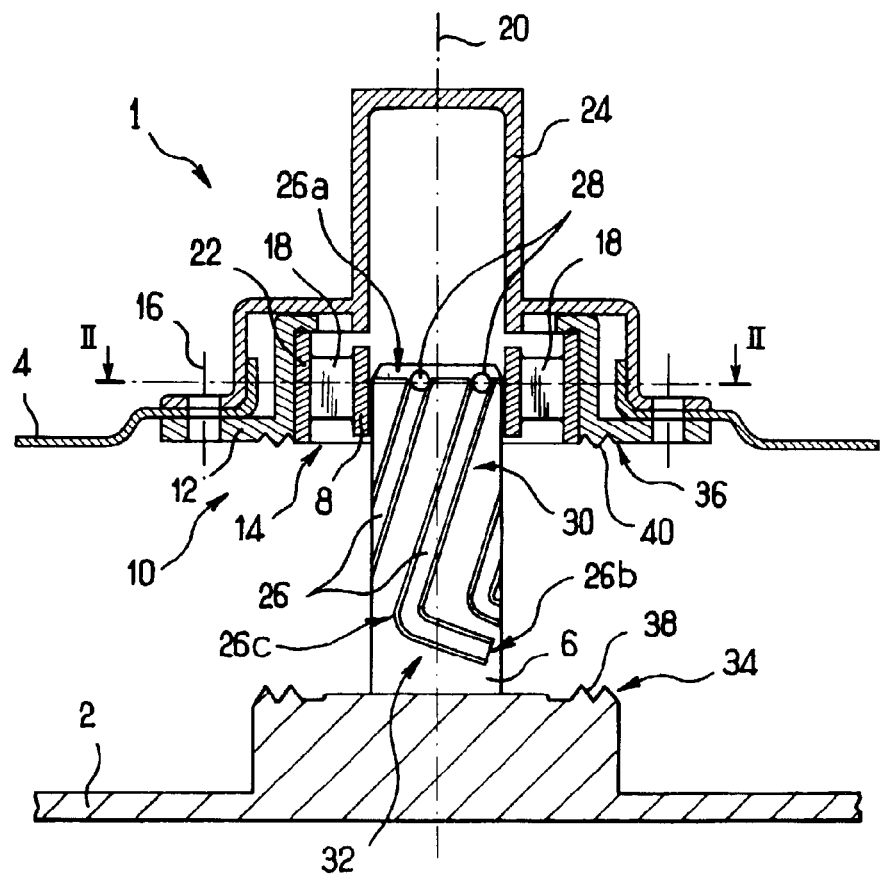
FIG_1
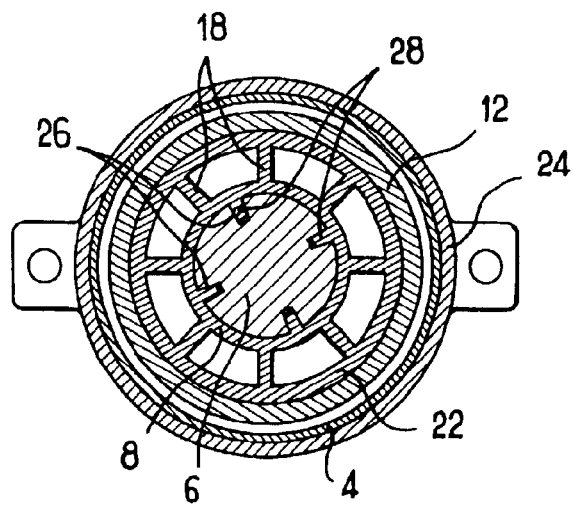
FIG_2

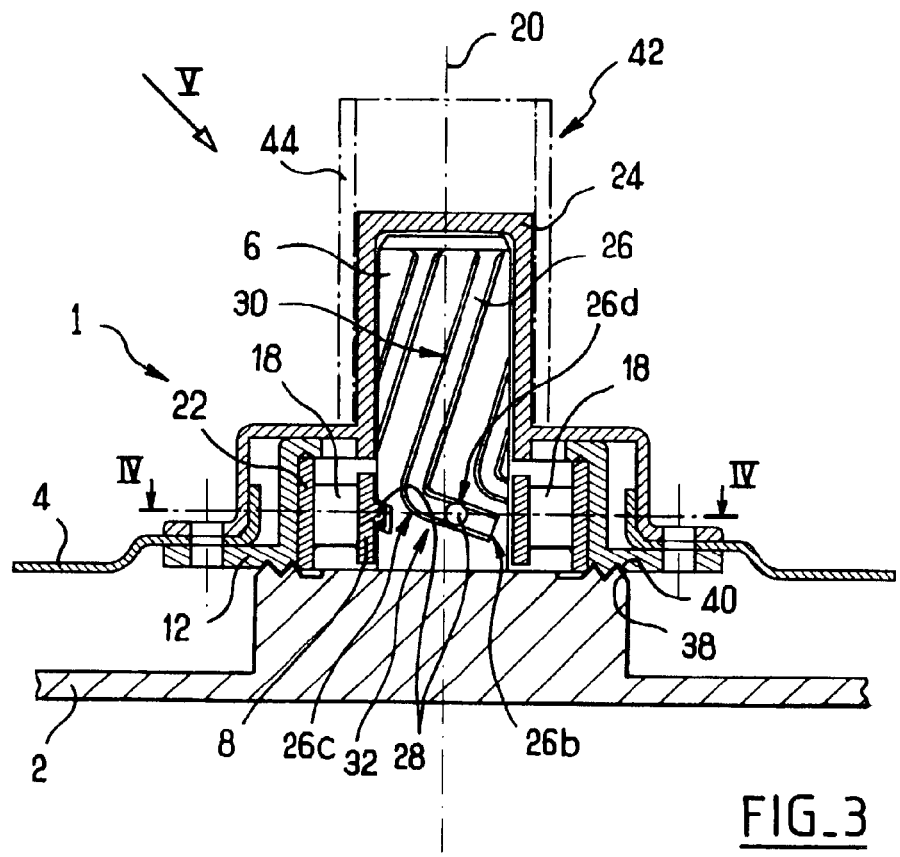
FIG_3
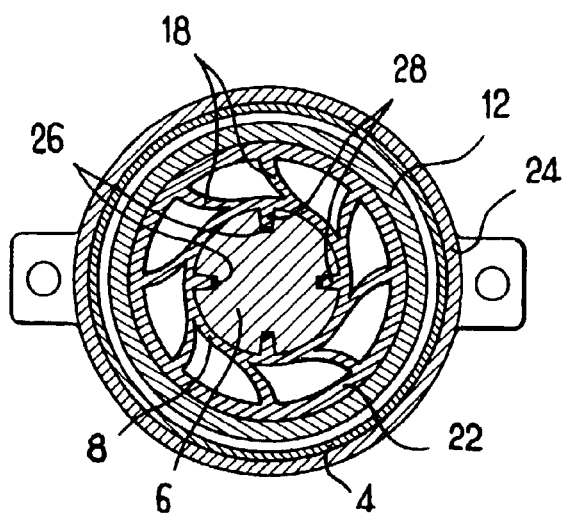
FIG_4

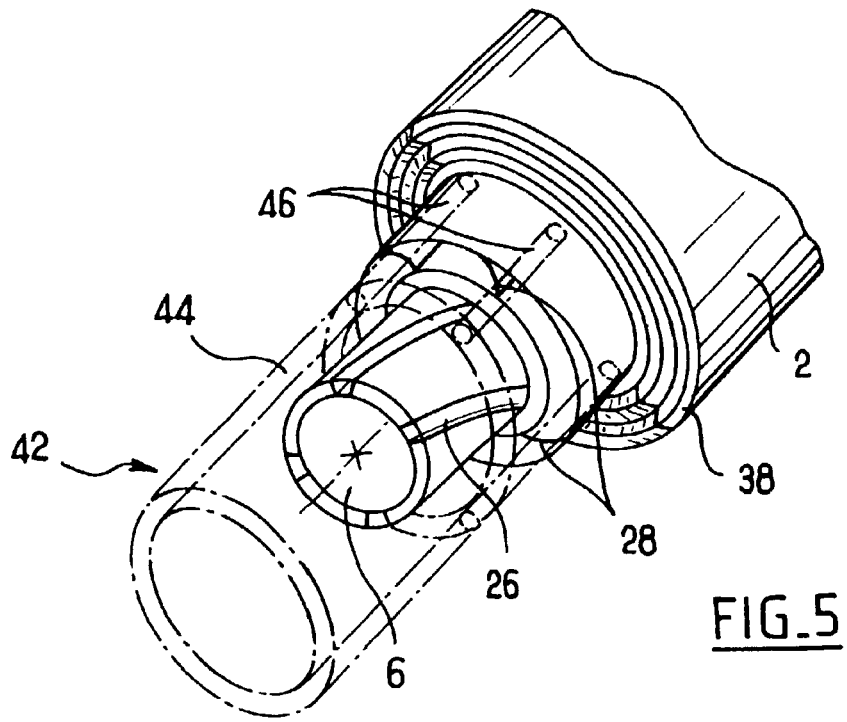
FIG_5
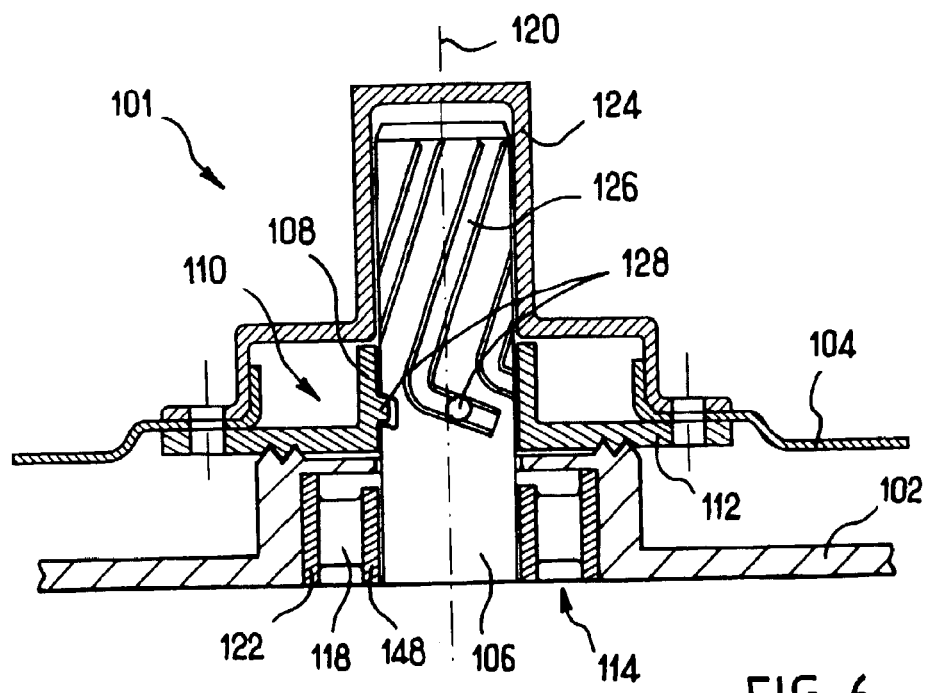
FIG_6

FIXING ASSEMBLY WITH HELICAL RAMP

BACKGROUND OF THE INVENTION

1. Field of the Invention

The invention concerns an assembly comprising two parts to be assembled. It aims in particular to simplify the operation of fixing the two parts together.

The invention finds its application in particular in the automobile field during the trimming of the passenger compartment of the vehicle, especially during the mounting of the dashboard on the structure of the vehicle.

2. Description of the Prior Art

To fix two parts, it is well known to use assembly screws. However, it is sometimes necessary to place the screws in places which are difficult to access. The operations consisting in holding the screw and screwing it during assembly while holding the parts to be assembled, or in unscrewing the screw and recovering it then often prove troublesome.

It is also well known to fix parts by means of clips. This solution allows rapid fixing of the parts. However, the fix obtained has only a low mechanical strength and disassembly often results in the breakage of the clip.

Moreover, U.S. Pat. No. 5,178,504 describes a rapid fixing device comprising:

a first and a second part to be fixed together, a fixing assembly comprising:

a first and a second fixing member intended to engage in each other in a direction of engagement between an engagement position and an assembled position, said first member being linked to the first part and said members being constituted:

one by a substantially cylindrical peg, substantially of circular cross section, provided with at least one groove extending substantially in said direction of engagement between a first end and a second end, said groove having a first helical ramp extending in a first direction between the first end and a first intermediate end, and the other by a tubular ring maintaining a passage intended to receive the peg, said ring comprising at least one pin protruding inside said passage, said pin being intended to be inserted into said groove to slide therein, means for guiding in rotation the second member relative to the second part, and resilient means linked on the one hand to the second member and on the other hand to the second part.

However, such an assembly, when it is subjected to vibration, especially when it is used on a motor vehicle, permits movements between the parts fixed to each other which, although small, nevertheless generate noise.

SUMMARY OF THE INVENTION

In order to remedy these drawbacks, the invention proposes that:

said groove comprises a second helical ramp extending in a second direction which is opposed to the first direction, between a second intermediate end and the second end, in the assembled position, the pin is disposed in the groove between the second intermediate end and the second end, and the first and second parts are pressed against each other by the action of the resilient means.

Thus, in order to fix the first and second parts and to maintain them pressed against each other, it is sufficient to bring them close to each other. When the pin follows the first portion of the helical ramp the resilient means are compressed. Then, when the pin is in the second portion of the helical ramp, the resilient means exert an effort tending to bring the two parts together. Since the said parts are pressed against each other, they have less tendency to move, so that a fix generating little noise and vibration between the parts is thus obtained.

Advantageously, in order to reduce even further the vibrations between said parts, the invention proposes that the first and second parts should have, in the one case a rib of conical or frustoconical section surrounding the first member and, in the other case, a groove of complementary shape receiving said rib.

The co-operation between the rib and the groove prevents any relative movement of the parts in their plane of contact.

According to another feature, the invention proposes, in order to facilitate the engagement of the first and second members in each other, while keeping them firmly pressed in the assembled position, that the second ramp has a pitch smaller than the pitch of the first ramp.

Thus, the effort necessary to engage the parts in each other will be less than the effort exerted between the parts in the assembled position.

According to another advantageous feature, the invention proposes, in order to constitute the resilient means, that the assembly comprises fins made of resiliently stretchable material linked on the one hand to the second member and on the other hand to the second part.

Since the production, assembly and recycling of the assembly are thus facilitated, its cost will be reduced.

In order to facilitate the taking apart of the first and second parts, the invention proposes that the device further comprises a taking apart tool having a tubular portion extending in a direction of elongation and at least two fingers extending in the longitudinal direction at the end of the tubular portion.

BRIEF DESCRIPTION OF THE DRAWINGS

The invention will be revealed more clearly in the following description, provided with reference to the appended drawings, in which:

FIG. 1 is a cross-sectional view of an assembly according to the invention in the engagement position, FIG. 2 is a sectional view along the line II—II in FIG. 1, FIG. 3 is a view of the assembly of FIG. 1, in the assembled position, FIG. 4 is a sectional view along the line IV—IV in FIG. 3, FIG. 5 is a partial, perspective view in the direction of the arrow V in FIG. 3, FIG. 6 illustrates an alternative embodiment, according to FIG. 3.

DETAILED DESCRIPTION OF THE PREFERRED EMBODIMENTS

FIGS. 1 to 4 illustrate an assembly 1 comprising essentially a dashboard structural member, here an air duct 2, a vehicle structural member, here a lower cross-member 4, and fixing means 10 for fixing the dashboard structural member to the vehicle structural member.

Said fixing means 10 have a direction of engagement 20 and comprise a peg 6, here obtained integrally with the air duct, a support 12 fixed to the lower cross-member 4 by screws (the presence of which is represented by an axis line 16), a ring 8, resilient means for guiding in rotation 14 interposed between the ring 8 and the support 12.

The assembly 1 further comprises a protective cap 24 fixed on the support 12 by way of screws 16.

The ring 8 is substantially tubular and has a substantially cylindrical inner surface of circular section having an axis of elongation extending substantially in the direction of engagement 20. It has pins 28, here four in number, distributed regularly at an angular offset of 90 degrees, projecting on its inner surface.

The resilient means for guiding in rotation 14 comprise fins 18 and an intermediate sleeve 22 which is welded on the support 12. The fins are made of resiliently stretchable material such as polyoxymethylene, polyvinyl acetal, polyformaldehyde (POM) or polypropylene (PP). They are obtained integrally with the ring 8 and with the intermediate sleeve 22. They further effect the guiding in rotation of the ring 8 relative to the support 12 about the direction of elongation of the ring 8.

The peg 6 is cylindrical, of substantially circular section, and has an axis of elongation extending substantially in the direction of engagement 20. It has, on its outer peripheral surface, helical grooves 26, here four in number, offset angularly by 90 degrees and extending between an engagement end 26a and a terminal end 26b.

Each of the helical grooves 26 is intended to receive one of the pins 28 and is constituted by a first ramp 30 extending between the engagement end 26a and an intermediate end 26c, and a second ramp 32 extending between the intermediate end 26c and the terminal end 26b. The first ramp 30 and second ramp 32 extend end to end in the direction of elongation of the peg 6 in opposed helical directions. In other words, they are of opposite pitch; here the first ramp 30 has a right-hand pitch and the second ramp 32 has a left-hand pitch.

Moreover, in absolute values, the pitch of the first ramp is greater than the pitch of the second ramp.

In order to fix the air duct 2 to the lower cross-member 4, a dashboard incorporating the air duct 2 is positioned relative to a vehicle structure incorporating the lower cross-member 4 until the peg 6 is brought, relative to the ring 8, into an engagement position illustrated in FIGS. 1 and 2, in which the pins are disposed at the engagement end 26a of the helical grooves 26.

Then, the dashboard is displaced relative to the vehicle structure and in particular the air duct 2 relative to the lower cross-member in the direction of engagement 20.

The pins 28 guided along the helical grooves 26 cause the ring 8 to rotate, thereby stretching the fins 18. During the movement of the pins along the first ramp 30, from the engagement end 26a to the intermediate end 26c, the ring 8 rotates from an initial position corresponding to the minimum stretch (in particular no stretch) of the fins 18 as far as an end position corresponding to the maximum stretch of the fins 18.

While the pins 28 are in the first ramp 30, the resilient means for guiding in rotation 14 tend to move the air duct 2 away from the lower cross-member 4. Then, beyond the intermediate end 26c, when the pins 28 are in the second ramp 32, by relaxing, the resilient means for guiding in rotation 14 exert an effort tending to bring the air duct 2 into contact with the lower cross-member owing to the fact that the pitch of the second ramp 32 is opposed to that of the first ramp 30.

While passing along the second ramp 32, the pins 28 pass from the intermediate end 26c to a fixing position 26d, disposed between the intermediate end 26c and the terminal end 26b, away from the terminal end 26b. In fact, the air duct 2, by way of a bearing surface 34, abuts a base surface 36 of the support 12, in the fixing position illustrated in FIGS. 3 and 4, before the pins reach the terminal end 26b.

In this position, the ring occupies an angular position between that corresponding to the intermediate end 26c and that corresponding to the engagement end 26a. Thus, since the fins 18 are stretched when the assembly is in the fixing position, the resilient means for guiding in rotation 14 maintain the air duct 2 under pressure against the lower cross-member 4, so that there is no risk of relative movement between the air duct 2 and the lower cross-member in the direction of engagement 20.

Moreover, the bearing surface 34 has on the periphery of the peg 6, all around the latter, two ribs of conical cross section 38 which are inserted into grooves 40 of complementary shape provided on the base surface 36 of the support 12, so that there is no risk of relative movement (vibration) occurring between the air duct 2 and the lower cross-member in a direction transverse to the direction of engagement 20.

The only mobility possible between the air duct 2 and the lower cross-member therefore consists of rotation about the direction of engagement 20. To prevent this, it is sufficient to provide complementary fixing means, if necessary identical to the fixing means 10, between the air duct 2 and the lower cross-member 4.

For taking apart the dashboard and therefore the air duct 2, the assembly further comprises a taking apart tool 42. As illustrated in FIG. 5, this taking apart tool has a main tubular portion 44 intended to fit round the peg 6, after having removed the protective cap 24, having a direction of elongation and terminating in cylindrical rods 46 forming fingers, here four in number, disposed in prolongation of the main portion 44 in the direction of elongation and intended to be inserted between the fins 18.

When the cylindrical rods 46 of the taking apart tool 42 are inserted between the fins 18, by rotating the taking apart tool 42, the ring 8 is caused to rotate. After bringing the pins 28 to the intermediate end 26c with the taking apart tool 42, when said pins are in the first ramp, the resilient means for guiding in rotation 14 then tend to move the air duct away from the lower cross-member and therefore to liberate the air duct.

The air duct 2 and the peg 6 will advantageously be made of reinforced plastics material, such as polypropylene filled with glass fibres (PPGFL).

FIG. 6 illustrates an assembly 101 differing essentially from the assembly 1 by an inversion of structure. The members of the assembly 101 corresponding to those of the assembly 1 have a reference number increased by 100.

The ring carrying the pins 128 is rigidly connected to the support 112, itself fixed to the vehicle structural member 104, while the resilient means 114 are interposed between the peg 106 and the dashboard structural member 102, which here no longer fulfils the function of air duct. Here, the resilient means 114, in addition to the intermediate sleeve 122 and the fins 118, comprise an inner sleeve 148 fixed to the peg 106. The intermediate sleeve 122 is welded to the structural member 102. The fins 118 are interposed between the inner sleeve 148 and the intermediate sleeve 122.

Thus, the peg 106 provided with its grooves 126 is from then on mounted so as to pivot about the direction of engagement 120, while the pins 128 are immovable.

The invention is of course in no way limited to the embodiment which has just been described by way of non-limiting example. Thus, the resilient means for guiding in rotation 14 could be replaced by conventional means for guiding in rotation, such as a ball bearing and conventional resilient means such as a spiral spring.

What is claimed is:

1. An assembly comprising:
    a first and a second part to be fixed together,
    a fixing assembly comprising:
        a first and a second fixing member intended to engage in each other in a direction of engagement between an engagement position and an assembled position, said first member being linked to the first part and said members being constituted:
            one by a substantially cylindrical peg, substantially of circular cross section, provided with at least one groove extending substantially in said direction of engagement between a first end and a second end, said groove having a first helical ramp extending in a first direction between said first end and a first intermediate end, and
            the other by a tubular ring maintaining a passage intended to receive the peg, said ring comprising at least one pin protruding inside said passage, said pin being intended to be inserted into said groove to slide therein,
        means for guiding in rotation the second member relative to the second part, said means for guiding in rotation the second member relative to the second part preventing axial motion along the direction of engagement of the second member relative to the second part,
        resilient means linked on the one hand to the second member and on the other hand to the second part, wherein:
    said groove comprises a second helical ramp extending in a second direction which is opposed to the first direction, between a second intermediate end and the second end,
    in the assembled position, the pin is disposed in the groove between the second intermediate end and the second end, and
    the first and second parts are pressed against each other by the action of the resilient means.

2. An assembly according to claim 1 wherein the first and second parts have in the one case a rib of conical or frustoconical section surrounding the first member and in the other case a groove of complementary shape receiving said rib.

3. An assembly according to claim 1, wherein the second ramp has a pitch smaller than the pitch of the first ramp.

4. An assembly according to claim 1 wherein the assembly comprises fins made of resiliently stretchable material, linked on the one hand to the second member and on the other hand to the second part.

5. An assembly according to claim 4, wherein the means for guiding in rotation comprise said fins.

6. An assembly according to claim 1, wherein the assembly further comprises a taking apart tool having a tubular portion extending in a direction of elongation and at least two fingers extending in prolongation of the tubular portion in the direction of elongation.

7. An assembly according to claim 1, wherein said first member is defined by the peg and said second member is defined by the ring.

8. An assembly according to claim 1, wherein said first member is defined by the ring and said second member is defined by the peg.

9. An assembly according to claim 1, wherein said first intermediate end and second intermediate end coincide, so that the first helical ramp and the second helical ramp are disposed end to end.

10. An assembly according to claim 1, wherein said resilient means comprises a torsion spring.

* * * * *